United States Patent [19]

Thwaites et al.

[11] 4,187,138

[45] Feb. 5, 1980

[54] SLICING WEB MATERIAL

[75] Inventors: Peter J. Thwaites, Eltisley; John N. Thornton, Abbotsley, both of England

[73] Assignee: Dufaylite Developments Ltd., Cambridgeshire, England

[21] Appl. No.: 851,907

[22] Filed: Nov. 16, 1977

[30] Foreign Application Priority Data

Nov. 16, 1976 [GB] United Kingdom ............... 47627/76

[51] Int. Cl.[2] ........................ B32B 31/00; B65C 11/04

[52] U.S. Cl. ...................................... 156/512; 156/578

[58] Field of Search ................ 156/512, 197, 264, 578

[56] References Cited

U.S. PATENT DOCUMENTS

| | | | |
|---|---|---|---|
| 2,940,504 | 6/1960 | Jacquet | 156/512 |
| 3,979,252 | 9/1976 | Hoyt | 156/512 |

*Primary Examiner*—Douglas J. Drummond
*Attorney, Agent, or Firm*—William A. Drucker

[57] ABSTRACT

Apparatus for cutting web material transversely to form sections has an arrangement for advancing the material a section at a time across a linear cutting edge. A linear guide parallel with the edge carries a circular blade which overlaps the linear cutting edge said blade being reciprocably driven along a linear guide. Each forward, and each reverse, cutting-stroke of the circular blade cuts off the then advanced section. The advancing arrangement is timed to operate between the ends of the forward strokes and the beginnings of the reverse strokes of the circular blade and vice versa. A preliminary advancing arrangement may be provided for advancing a measured amount of web material to form slack which is taken-up by advancement of the material across the linear cutting edge. Structural honeycomb material may be produced by using two layers of material laminated together by bands of adhesive, and bearing other bands which are exposed, and arranging pressing devices which follow the circular blade and press the sections into a receiving throat.

26 Claims, 6 Drawing Figures

SLICING WEB MATERIAL

SPECIFICATION OF THE INVENTION

The present invention relates to structural honeycomb materials and other assemblies formed from sheet material.

Structural honeycomb material, described in British Pat. No. 591,772 and elsewhere is formed in the unexpanded state from sheet material, originally manufactured in the form of a continuous web, and consists of cut strips of the sheet material adhesively secured together. A standard practice has been to form the honeycomb material in two stages. In the first of these stages, layers of the sheet material are secured together by the adhesive to form a block which is sliced, in the second stage, to yield the material in the thickness required. This slicing is normally performed by a guillotine which cuts repeatedly through the layers of the block and divides them into strips, secured together by the adhesive, whose widths are constant in any slice and are equal to the required thickness.

Each stroke of the guillotine slices through the entire thickness of the block to form a substantial number of cut edges. A good rate of output is achieved, but there is the disadvantage that an unusable end portion of the block remains at the end of the slicing operation and must be discarded. It is attractive to cut the sheet material directly from the continuous web to form strips of the final required width (which determines the thickness of the honeycomb) and assemble the strips to form unexpanded honeycomb material so that virtually all of the web is formed into useful product.

An object of the present invention is to provide an improve apparatus for cutting web material transversely to form strips or other (wider) sections. Another object is to provide such apparatus in a form for producing honeycomb material.

By the present invention, there is provided an apparatus for cutting web material transversely to form sections of the material which comprises a blade formed with a linear cutting edge, means for advancing the web material a section at a time adjacent to the linear cutting edge and clamping the web material in advance to the edge with the sections projecting beyond the edge in turn, a linear guide parallel with the edge, a mounting movable to and fro, along the linear guide, a blade carried by the mounting and formed with a circular peripheral cutting edge positioned to overlap the linear cutting edge, in web-material cutting association therewith, on the side thereof beyond the advancing means, and a drive for moving the mounting to and fro along the guide in a continuous cyclic movement in which the mounting is moved in a first direction to a first reversal position, reversed in its motion, moved in the opposite direction to a second reversal position and again reversed in its motion for further movement in said first direction, said advancing and clamping means being operable to advance a section of the web material when the mounting is in the region of its reversal positions and to clamp the web material when the mounting is moving to or fro over an intermediate part of its motion between the reversal positions, said blades co-operating to cut the web material transversely during each intermediate part of the cyclic movement of the mounting to cut off the then projecting section of the web material and leave the remainder of the web material with a cut edge in the position of the linear cutting edge. In order to prevent adhesion of the said cut edge to the linear cutting edge, as may occur with some web materials, means may be provided for displacing said cut edge from the linear cutting edge across the direction of advancement of the web material before there has been substantial advancement of the web material after the transverse cutting.

The apparatus avoids the difficulty of providing a pair of blades with linear cutting edges set and maintained in such adjustment that the cutting edges cooperate effectively, in high speed operation and without undue wear over the width of the web material. Reliable cutting of the sections is obtained in both directions of movement of the carriage.

In a simple arrangement, the displacing means is resiliently loaded and is arranged to displace the cut edge by a forward movement under its resilient loading and to be given a return movement by the clamping means.

The blade formed with the linear cutting edge may be provided at intervals along its length with adjustment devices, for example screw-threaded members bearing upon the blade, operable, by deforming the blade locally, to adjust the linear cutting edge to maintain the cutting association with the peripheral cutting edge substantially parallel with the guide on which the mounting reciprocates. Such adjustment devices remove the necessity to provide and maintain a linear cutting edge which is truly straight. The adjustment devices can be operated as a matter of routine to compensate for wear, including irregular wear, of the linear cutting edge and/or the guide as well as for the initial matching of a particular blade having a linear cutting edge with a particular guide. It is contemplated that the machine may be provided with a facility to instal a gauge, e.g. of the dial type, to the mounting and movable along the guide to facilitate routine adjustment of the linear cutting edge.

A preferred form of drive for moving the mounting is a loop of flexible material arranged with a lap connected with the mounting and extending generally parallel with the linear guide. This loop may be movable in a reciprocating manner by a continuously rotatable crank arrangement, e.g. via a connecting rod actuating a slide. To reduce the throw required of the crank or other reversing mechanism, a second loop may be provided and the first loop driven via speed-increasing arrangement by the second loop.

Conveniently, the drive for moving the mounting is a belt extending around a pair of pulleys to provide a lap connected with the mounting and extending generally parallel with the linear guide, at least one of said pulleys being drivable by a second belt in a speed-increasing arrangement, said second belt being arranged for reciprocating movement by a slide arranged for reciprocating motion by a continuously rotatable crank arrangement. The belts and pulleys are preferably of the toothed type.

Operation of the apparatus at commercially acceptable rates, and especially for a web material of substantial width, involves acceleration of the mounting and the blade carried thereby to reverse their linear motion at the reversal positions. The mass of the mounting and blade is readily made low enough to maintain the required accelerating force within the capabilities of drive arrangements as just described and a continuously rotatable crank arrangement provides smooth transition between the phases of the motion.

The drive for moving the mounting is conveniently powered by a motor which is arranged to actuate the advancing and clamping means in synchronism with the movement of the guide. For example, the clamping means is operable in response to a cam driven by the motor.

For some purposes, the blade formed with the circular peripheral cutting edge may simply idle as it traverses the web. It is preferred however, especially for high speed operation, to provide this blade with means for rotating it during its movement with the carriage, the direction of rotation being such that the portion of the peripheral cutting edge which overlaps the linear cutting edge moves in the opposite direction to the movement with the carriage. A simple form of rotating means is a wheel carried with the blade on a common spindle and driven, as the carriage is moved, by engagement with a stationary member. The stationery member may be a wire or other flexible material lapped round the wheel, or a rack engaging teeth formed on the wheel.

As so far described, the apparatus is generally useful for cutting web material transversely into sections. It may be used, for example, for cutting a web of paper into sheets of uniform size, providing a favourable combination of speed, cutting size, blade cost and compensation for blade wear. For this purpose, the web material may be advanced in a horizontal plane over the linear cutting edge and the severed sheets allowed to fall to a stacking position or apparatus. Two or more webs may be superposed for cutting together.

For the production of honeycomb material the apparatus may be provided with a throat for locating the transversely cut sections in face to face relationship with their cut edges registered and a pressing device movable with the mounting to follow the blade with the circular peripheral cutting edge for pressing upon each projecting section of the web as the section is being cut so that the cut portion of each section is progressively pressed along its length into the outlet whilst the cutting of said section proceeds.

In a preferred form of apparatus for the production of honeycomb material, the mounting carries a pair of said pressing devices each of which is movable between an operative position and a withdrawn position so that one pressing device follows the blade across the web material as the mounting is moved in the other direction. For mechanical simplicity, the pressing devices may be movable by a mechanism reversible adjacent to the reversal positions of the mounting by engagement with fixed parts of the apparatus. A suitable reversing mechanism is a slide carried by the mounting and having a pair of cam-formations, one for each pressing device.

For the manufacture of paper honeycomb using an ordinary wet adhesive, as is usually required, the apparatus is fed with two webs of paper laminated together by a first set of longitudinal bands of adhesive applied either in a preliminary step or as the webs are fed. A printing roller or other applicator applies a further set of longitudinally extending bands of adhesive, positioned to lie between the bands of the first set, to the outer face of that web which is to be advanced adjacent to the linear cutting edge of the apparatus. As the sections cut from the laminated webs are pressed into the outlet they are bonded together to produce the honeycomb in a continuous operation.

The means aforesaid for advancing and clamping the web material is advantageous by a final advancing and clamping means preceded by primary advancing and clamping means, said primary and final means being arranged to operate so that the primary means advances the web material whilst the final means is clamping it and clamps the web material whilst the final means is advancing it, the rate of the advancement by the primary means being less with the primary means than with the final means. With this arrangement the primary means produces a measured amount of slack in the web material, and all that is required in the advancing operation of the final advancing and clamping means is to take up this slack. The primary means can perform the measuring function whilst the final means is holding the web material clamped and the severing operation is being performed by the blades. A more consistent distance of advance of the web material, and consequently a more consistent dimensioning of the cut sections is obtained than when the measuring function is performed by the final advancing and clamping means alone during the intervals between the cutting operations of the blades.

In a preferred arrangement, the final advancing and clamping means has final advancing means arranged to be capable of advancing the web material by pulling it through a greater distance than the distance through which it has been advanced by the primary means. For example the final advancing means has rotary members for gripping and advancing the web material, said rotary members being driven by means adapted, by slipping, to enable the rotary members to step rotating when they have advanced the web through the distance through which it has been advanced by the primary means. These rotary members may be driven by friction clutches which yield when the slack is consumed, ie. when the previously measured amount has been finally advanced for clamping and cutting.

The primary advancing and clamping means advantageously has primary advancing devices in the form of gripping members rotatable in gripping association with the web material. For precision of operation these gripping members may be crank driven in an oscillatory manner. To avoid their interfering with the step of taking up the slack, the gripping members may be arranged to be retractable out of their gripping association and provided with retracting means for so retracting them during advancement of the web material by the final advancing means. This arrangement is preferable to having the gripping members in continuous engagement with the web material and arranging them to free-wheel whilst the slack is taken up. It avoids their acceleration by the web material and also difficulties in starting them correctly for the performance of their next matering operation.

The following description of a preferred embodiment of an apparatus according to the invention, provided in a form for the production of structural honeycomb material, in which description reference is made to the accompanying drawings is given in order to illustrate the invention. In the drawings.

Figures 1, 2:
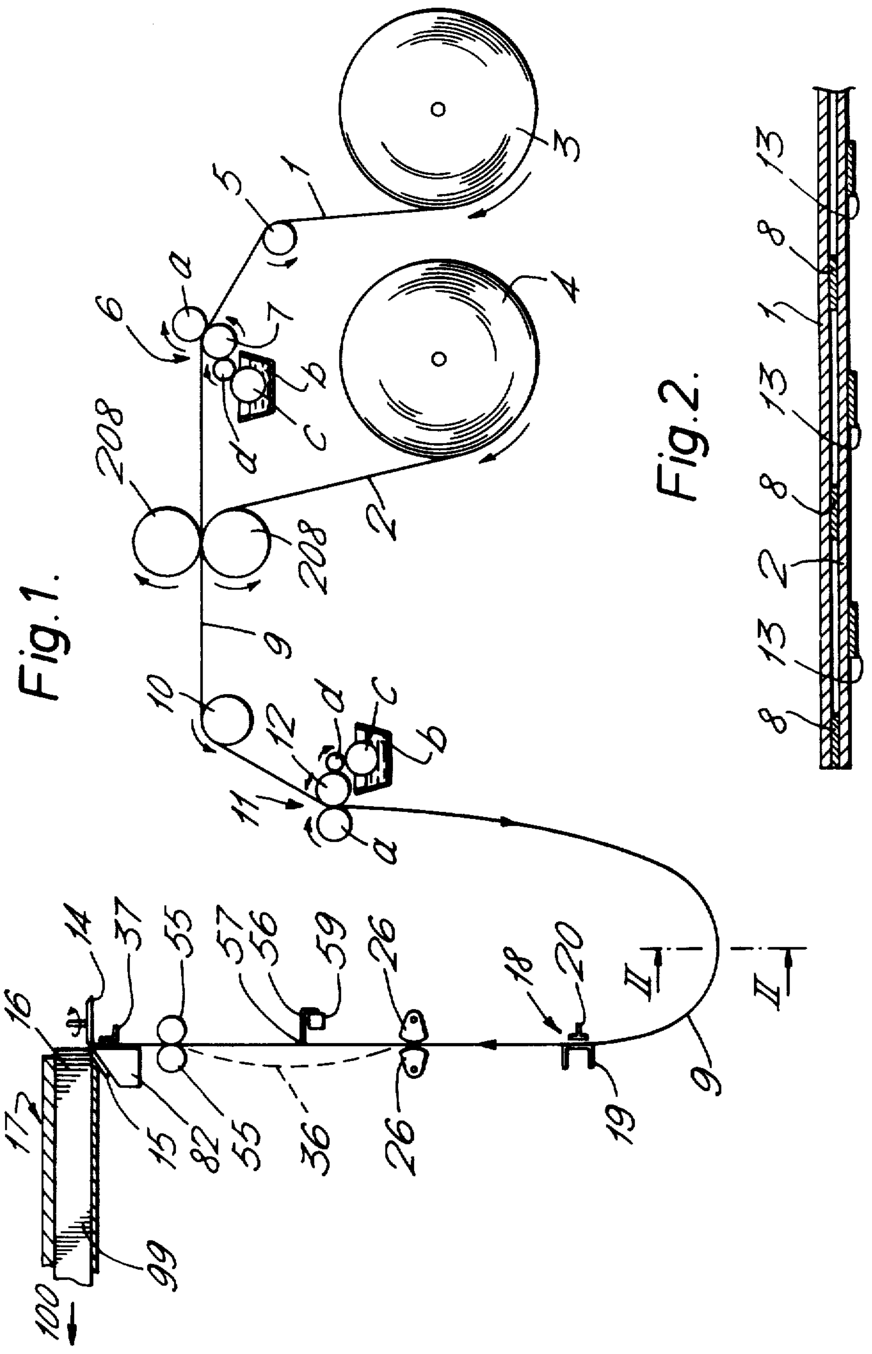
FIG. 1 is a diagrammatic drawing showing the general arrangement of the apparatus, which has a first section for producing adhesive-bearing two-ply web material and a second section for forming the web material into structural honeycomb material.
FIG. 2 is a cross-section, on an enlarged scale, taken along II—II of FIG. 1.

FIG. 1 shows webs 1 and 2 of kraft paper or other cellulosic material drawn from supply rolls 3 and 4. Web 1 passes over a guide roller 5 and through a roller-printing unit to where a printing roller 7 applies to the web longitudinally extending bands, spaced apart, bands 8 of adhesive to one of its faces. Printing unit 6 is conventional. It has a backing roller a, a trough b containing adhesive, a pick-up roller c, and a transfer roller d. From printing unit 6 web 1 passes between pressure rollers 208 the adhesive-bearing face of web 1 is brought into contact with web 2 and subjected to pressure to form a two-ply web material 9 which, after passage over a guide roller 10 passes through a second roller printing unit 11. Unit 11 is similar to unit 6. Parts a, b, c and d correspond with the similarly identified parts of unit 6. In printing unit 11, a printing roller 12 applies further longitudinally extending bands 13 of adhesive to one face of the two-ply material 9. As shown in FIG. 2, bands 13 are positioned to lie mid-way in the width dimensions of webs 1 and 2, between the bands 8.

The two-ply web material bearing bands of adhesive on an outer face is known in the art of honeycomb manufacture. Eventually, when the material is sliced by rotary blade 14, spring-loaded by spring 14*a* into contact with blade 15 having a linear cutting edge, and the resulting two-ply sections are packed together at 16 in throat 17, the bands 13 join the slices together to form honeycomb material in the unexpanded state, which material is expandable under tension to the expanded state in which it has an open hexagonal, cellular structure.

Beyond printing unit 11, the material passes to a primary clamp 18. It hands loosely between these parts in the form of a catenary. This arrangement allows the printing rollers to operate continuously and the parts of the apparatus beyond them, including clamp 18 to act intermittently in the manner to be described. By providing devices to detect predetermined upper and lower limits for the lowest point of the catenary, eg., photocells, the continuous web movement elements of the machine can be automatically controlled to satisfy the demands of the intermittently-acting cutter.

Figure 3:
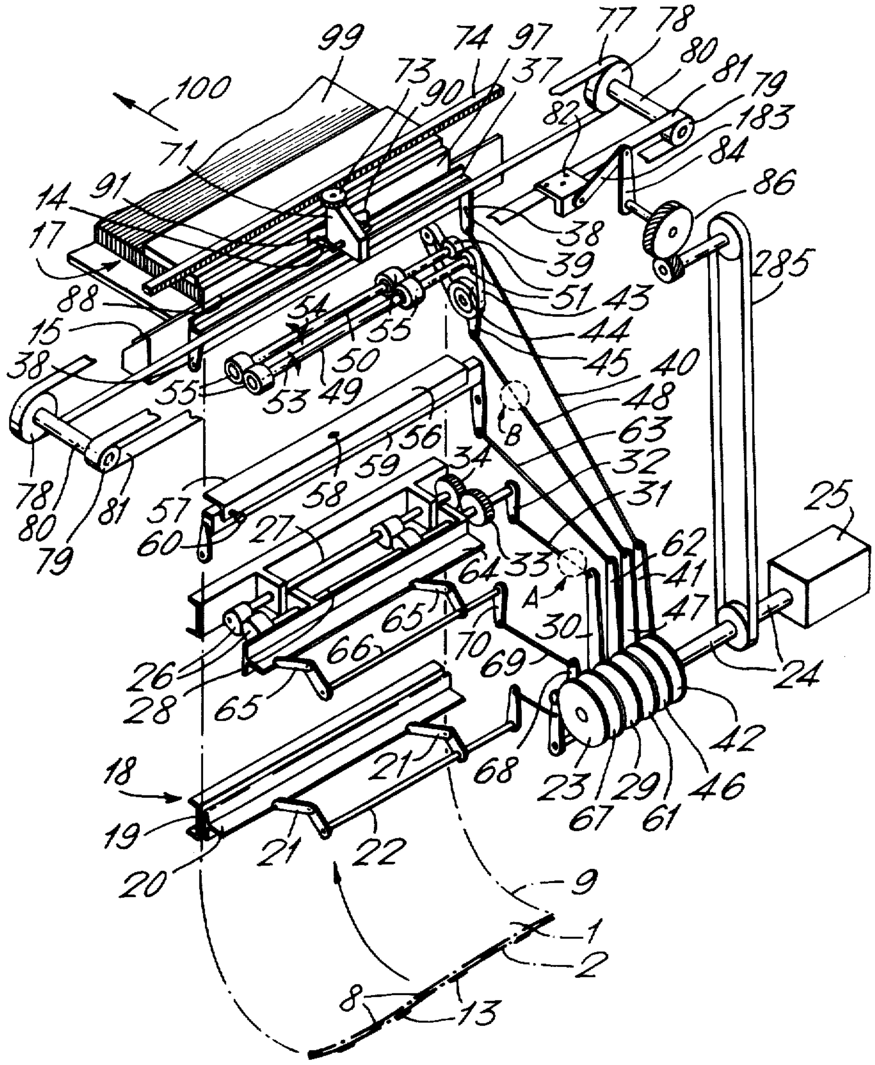
FIG. 3 is a perspective showing the arrangement of the principal parts of the said second section except the mounting for the carriage.

Primary clamp 18 and the parts of the apparatus which follow it, are shown in greater detail in FIG. 3 than in FIG. 1. Clamp 18 has a fixed backing part 19 and a part 20 movable into and out of the clamping state shown in FIG. 3 by articulated linking members 21 movable by a shaft 22 which is given an oscillatory rotational motion by the first cam 23 of a set of six cams carried by a continuously rotating shaft 24 driven by a main drive diagrammatically indicated at 25.

With clamp 18 out of its clamping state, the web material is advanced between rubber gripping members 26 mounted for oscillatory rotation upon a pair of shafts 27 and 28. Members 26 are arranged as shown in pairs. Each pair has one member positioned to act upon one face of the web material and the other member positioned to act upon the other face thereof. The parts of the peripheral faces of the members 26 which contact the web material are cylindrical and co-axial with shafts 27 and 28. In FIG. 3, members 26 are shown in gripping relationship with the web material. To advance the material by a measured amount, shaft 28 is given a rotational movement by the third cam 29 on shaft 24 which acts via a cam-follower 30, and a link 31 acting upon a lever 32 keyed to shaft 28. Shaft 28 carries a pinion 33 which engages a similar pinion 34 to give an equal and opposite rotational movement. The advancement of the material by members 26, produces slack indicated by the broken line at 36 in FIG. 1.

During the advancement, the material is held clamped below blades 14 and 15 by a transverse bar 37 mounted on arms 38 pivotally mounted at 39 for movement into and out of its clamping position by a linkage 40 connected with a cam follow 41 driven by the sixth cam, 42, on shaft 24.

When rotary blade 14 is co-acting with blade 15 to cut a section from the web material, bar 37 holds the web material clamped. After a section has been cut, and blade 14 is beyond one or the other edge of the material bar 37 is moved from its clamping position. With clamp 18 in its closed state, a belt 43 is driven by a one-way drive 44 actuated by a lever 45 moved by a cam 46, on shaft 24, acting via a cam follower 47 and a linkage 48. The movement of belt 43 rotates shafts 49 and 50 via pulleys 51 and 52 in the opposite directions indicated by arrows 53 and 54, causing the rotation of secondary advancing members 55 having cylindrical peripheral surfaces in permanent engagement with the web material. The members 55 are of the slipping clutch type. They operate to take up the slack (FIG. 1) and thereby advance the cut edge of the laminated web material until the material is tight back as far as the primary clamp 19. The members 55 then slip with the web material taut. In this way the members 55, whose time for operation is restricted to within periods when the rotary blade 14 is clear of the web, produce an advancement of the material comparable in accuracy with the advancement produced in a longer period of time by members 26.

In practice, the edges of the laminated material delivered to the primary clamp 18 can vary relative to one another in length. To compensate for this variation, a cross-bar 56 having a web-engaging edge 57 is mounted for movement about a pivot 58 to a frame 59. An adjusting screw 60 enables the orientation of edge 57 to be set as required to tighten the web material across its width. Edge 57 is brought into engagement with the material (by a cam 61 on the shaft 24 operating via a cam follower 62 and a linkage 63) when the bar 37 is in the clamping position, primary clamp 18 is open and the members 26 are out of gripping relationship with the material. The action of edge 57 accordingly extends back to the material 9 hanging in the aforementioned catenary.

The gripping action of the members 27 is interrupted as required by moving shaft 28, and the two members thereon away from the web material. Shaft 28 is mounted upon a bar 64 which is moved to and fro by a pair of lever systems 65 connected with a shaft 66 rotatable by a cam 67 on shaft 24, a cam follower 68 and a linkage and lever, 69 and 70 respectively. The members 26 are re-positioned for their next advancement of the web material whilst shaft 28 is locating the two members thereon out of contact with the web material. This action is produced by the shape of the cam 29. Only a short movement of shaft 28 is required and pinions 33 and 34 are sufficiently deep-toothed to enable them to remain enmeshed when shaft 28 is moved.

Figure 4:
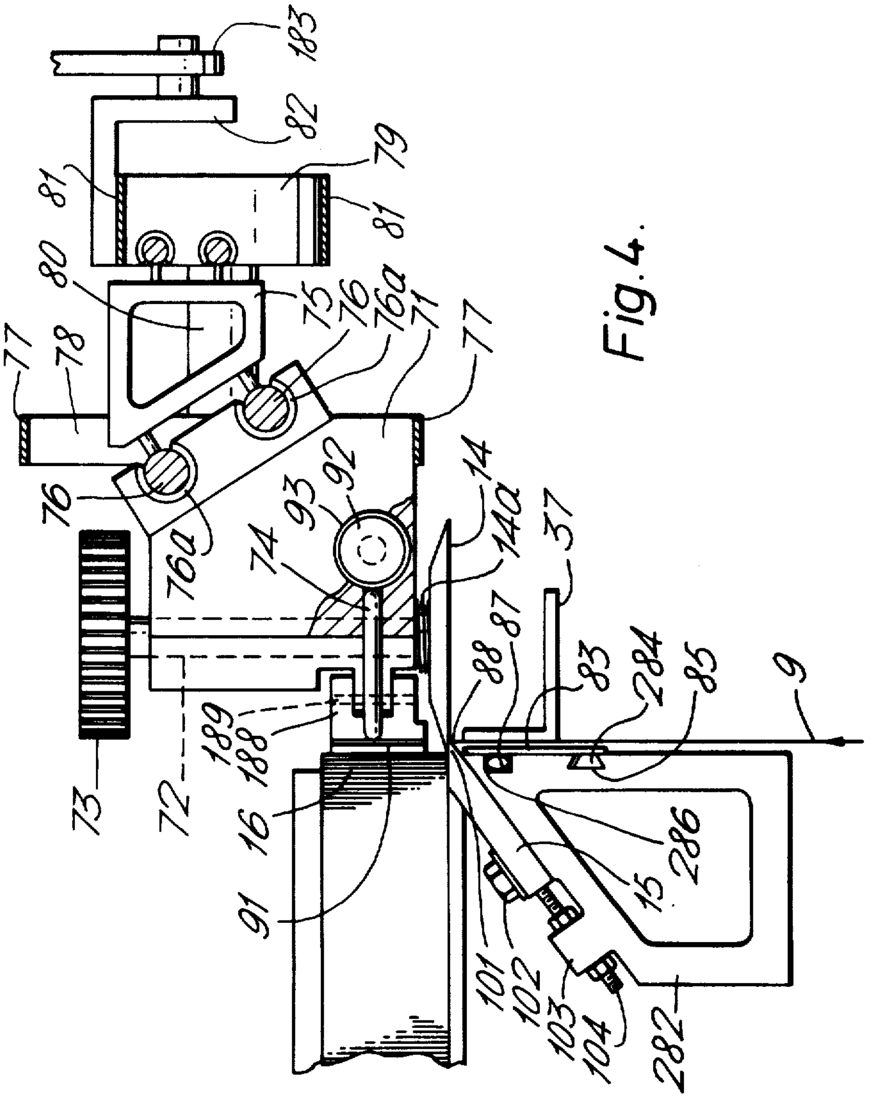
FIGS. 4 and 5 are cross sections showing parts of the second section in further detail, the said mounting being shown in FIG. 4.

A carriage 71 is fitted with a vertical spindle 72 (FIG. 4) to the bottom end of which is secured the rotary blade 14. At its upper end the spindle has keyed thereto a pinion 73 which engages a transversely extending rack 74. A transverse beam 75 of hollow cross section carries slides 76 with which carriage 71 is engaged by linear bearings 76a as shown in FIG. 4 for a to and fro movement in which it is driven by the lower lap of a belt 77 which passes round pulleys 78. These pulleys are mounted together with pulleys 79, whose diameters are one third of the diameters of pulleys 78, upon shafts 80. A belt 81 extending round pulleys 79 has, secured to its upper lap a clamp 82 which is connected by a link 183 with a crank 84 driven in continuous rotary motion by main drive 25 via a belt 285 and reduction gear 86.

Because of the different diameters of pulleys 78 and 79, the to and fro motion of belt 81 produced by crank 83 is increased threefold so that the rotary blade 14 is driven across the whole width of the web material between the reversals of its linear motion.

As shown in FIG. 4, the web material 9, where it is pressed towards transverse holder 282 for blade 15 by clamping bar 37 is backed by a transverse metal strip 83. Strip 83 is located by formations 284 having a loose fit in a dovetail groove 85 formed in holder 282. Parallel with groove 85 is a further groove 286 in which is located rubber tubing 87. When bar 37 is retracted to permit the feeding of a section of the material over the cutting edge of blade 15, the rubber tubing expands to pivot the strip 83 in a clockwise direction, as viewed in FIG. 4, so that the cut edge 88 of the web material 9 is positively disengaged from blade 15. Adhesion of edge 88 to blade 15, which is to be anticipated at least occasionally with some grades of web material, would interfere with the feeding, over blade 15, of the next section to be cut.

Figure 5:
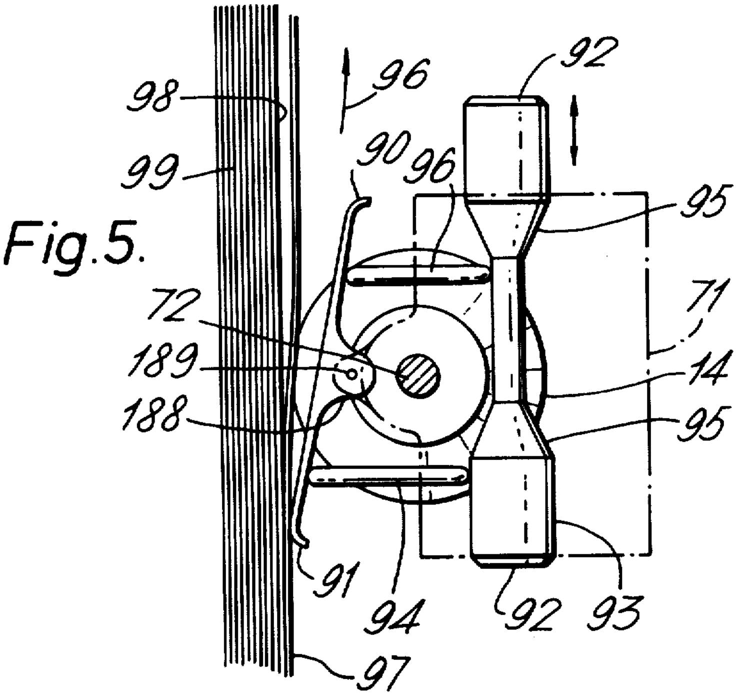

Mounted upon carriage 71 over blade 14, is a member 188 pivotable at 189 (FIG. 5) and extending to provide an integrally formed pair of pressing devices 90 and 91. When the carriage 71 is reaching an end of its linear travel, one or other end 92 of a bar 93, slidably mounted on the carriage, engages a fixed stop (not shown) provided on the apparatus and is therefore moved axially relative to the carriage. The movement causes the ends of a pair of plungers 94 (spring-loaded by means not shown) to ride over cam surfaces 95 formed on bar 92. The distil ends of plunger 94 are thereby caused to move in opposite directions and pivot member 188 so that one or other of pressing devices 90 or 91 is swung into its operating position. When the carriage 71 is carrying blade 14 in a cutting movement in the direction of arrow 96, pressure device 90 is retracted and pressure device 91 follows the blade to press the section 97 of the material being cut past the cutting edge of blade 15 and pack it against the previously cut section 98. The effect is to press the sections, during their cutting, in turn into the throat 17 (FIG. 1) so that they are adhered together by the bands of adhesive 13 (FIGS. 1, 2 and 3) to form honeycomb material 99 in the unexpanded state.

The honeycomb material thus produced is drawn away in the direction of arrow 100 (FIGS. 1 and 3) for storage (eg. in lapped form in a stillage) or immediate use eg. involving its expansion in the direction of arrow

100 to the open cellular state and lamination between facing materials in the manufacture of doors or other building panels.

The cutting system of the apparatus is capable of producing honeycomb material of which the constituent strips have a width, edge characteristics and edge parallelism which are commercially satisfactory. These requirements have been difficult to achieve heretofore in the production of material directly in the thickness required, at an economic rate.

Referring to FIG. 4, blade 15 is secured to mounting 82, at intervals along its length, by bolts 102 tightened to a limited torque and passing through oversized holes in the blade. Mounting 82 has along its length a series of lugs 103 through which pass screws 104. Because blade 15 is inclined as shown, its edge 101 is adjustable (in a direction having a vertical component) by bolts 104 to yield or restore a closely cooperating cutting relationship along its length with blade 14. The straightness of cutting is determined by the linearity of the slides 76.

Figure 6:
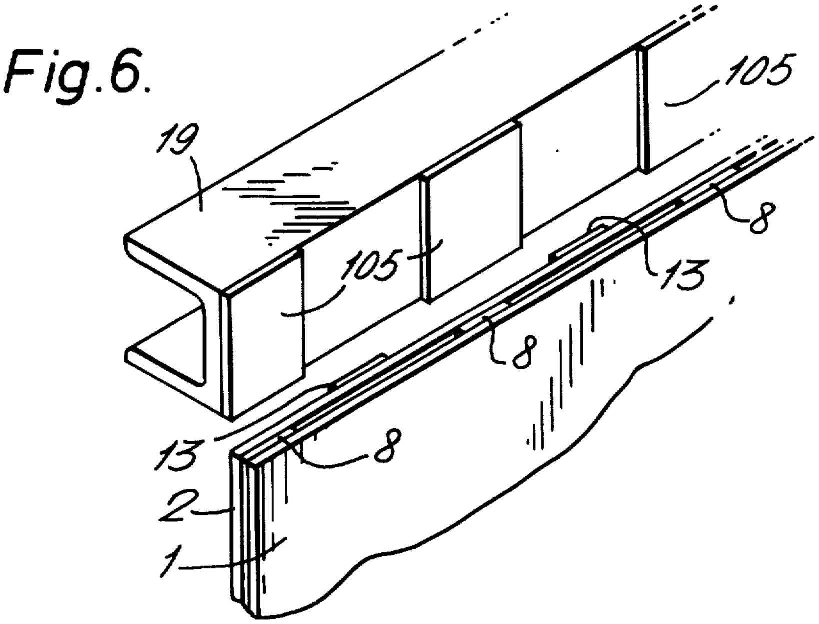
FIG. 6 is a perspective showing part of the said second section on an enlarged scale for purposes of further explanation.

As will be understood from FIGS. 1, 2 and 3 the two ply web used in the manufacture of honeycomb material has bands of adhesive 13 exposed on one face. To avoid disturbing these bands, those parts of the apparatus which contact this face (19, 26, 55 and 83) are, in practice, relieved at the positions of the bands 13. This is readily achieved. By way of example, part of backing part 19 is shown in FIG. 6. Here relief is provided by adhesively securing rubber pads 105 to contact the material between the adhesive bands.

Honeycomb material is required in a range of thickness. The thickness obtained with the apparatus shown depends upon the amount by which the edge of the material is advanced by members 26 and 55. It may be made variable by interposing adjustment devices in linkages 31 and 48 as indicated diagrammatically at A and B in FIG. 3. Such devices may take the form of incrementally or continuously adjustablefulcrum levers. More complex lever arrangements giving the required effect are widely understood in the mechanical art. The preferred lever arrangement incorporates a tandem kinetic four bar chain which gives a high velocity ratio when required and is adjustable whilst the apparatus is running. The latter property is especially advantageous when settingup the machine to produce honeycomb material of a newly required thickness.

The cutting edge 101 of the blade 15, is constituted by the intersection of two surfaces. Sharpening of blade 15 is performed by grinding the generally planar upper surface. In the operation of the apparatus, the rotary blade 14 laps this surface inwardly from the cutting edge and the two blades have a mutual honing action. The straightness of the cut depends primarily upon the straightness of beam 75. Any departure from true straightness of cut occurs at both edges of the strips. It has virtually no effect upon their constancy of width and its effect upon the flatness of the honeycomb material produced tends to be insignificant because of the flexibility of the material in its expanded form.

We claim:

1. Apparatus for producing structural honeycomb material from web material provided in the form of a plurality of superposed webs by cutting sections from the web material by transverse cutting and joining the sections together, which apparatus comprises a blade formed with a linear cutting edge, releasable clamping means for clamping the sections in turn so that they project in turn beyond said edge, a linear guide parallel with the edge, a mounting movable to and fro along the linear guide, a blade carried by the mounting and formed with a circular peripheral cutting edge positioned to overlap the linear cutting edge, in web-material cutting association therewith, a drive for moving the mounting to and fro along the guide in a continuous cyclic movement in which the mounting is moved in a first direction to a first reversal position, reversed in its motion, moved in the opposite direction to a second reversal position and again reversed in its motion for further movement in said first direction, said blades cooperating to cut the web material transversely when the mounting is moving to or fro over an intermediate part of its cyclic movement between the reversal positions to cut off the then projecting section of the web material and leave the remainder of the web material with a cut-edge at the position of the linear cutting edge, advancing means arranged to advance a section of the web material towards said clamping means whilst the mounting is moving over said intermediate part of its motion actuating means operable to release the clamping means temporarily whilst the mounting is travelling outside said intermediate part of its motion and thereby permit said section of the web material to project in its turn beyond said edge, supply means for providing the superposed webs by bringing a plurality of separate webs into face to face relationship, said supply means having adhesive applicators for securing the webs together by longitudinally extending bands of adhesive, and means for applying adhesive to the web material to join the cut sections together in face to face relationship.

2. Apparatus according to claim 1 having displacing means for displacing said cut edge from the linear cutting edge across the direction of advancement of the web material before there has been substantial advancement of the web material after the transverse cutting.

3. Apparatus according to claim 2 in which the displacing means is resiliently loaded by resilient means and is arranged to displace the cut edge by a forward movement produced by the resilient means, and to be given a return movement by the clamping means.

4. Apparatus according to claim 1 in which the drive for moving the mounting is powered by a motor which is arranged to actuate the advancing and clamping means in synchronism with the movement of the mounting.

5. Apparatus according to claim 4 in which the clamping means is operable in response to a cam driven by the motor.

6. Apparatus according to claim 1 having means for rotating the blade formed with a circular peripheral cutting edge during its movement with the carriage, the speed of rotation being different from the rolling speed of said blade along said linear cutting edge.

7. Apparatus according to claim 6 in which the rotating means is a wheel carried by the carriage and driven, as the carriage moved, by engagement with a stationary member.

8. Apparatus according to claim 7 in which the stationary member is formed of flexible material and is lapped round the wheel.

9. Apparatus according to claim 7 in which the wheel is formed with teeth and the stationary member is a rack having teeth engaged with the teeth of the wheel.

10. Apparatus according to claim 1 having means defining a throat for locating the transversely cut sections in face to face relationship with their edges cut by the blades registered together and a pressing device movable with the mounting to follow the blade with the circular peripheral cutting edge for pressing upon each projecting section of the web as the section is being cut so that the cut portion of each section is progressively pressed along its length into the throat whilst the cutting of said section proceeds.

11. Apparatus according to claim 10 in which the mounting carries a pair of said pressing devices each of which is movable between an operative position and a retracted position, the movement being so arranged that one pressing device follows the blade across the web material in its operative position as the mounting is moved in one direction and the other follows the blade across the web material in its operative position as the mounting is moved in the other direction.

12. Apparatus according to claim 11 in which the pressing devices are movable between their operative and retracted positions by a mechanism which is reversible adjacent to the reversal positions of the mounting by engagement with fixed parts of the apparatus.

13. Apparatus according to claim 12 in which the pressing devices are movable between said positions by a slide carried by the mounting and having a pair of cam-formations one for each pressing device.

14. Apparatus according to claim 10 having supply means for supplying the web material thereto in the form of a pair of webs superposed in face to face relationship, said supply means having adhesive applicators for securing the webs together in said relationship by longitudinally extending bands of adhesive and applying other such bands to an outer face of one of the webs, said other bands being positioned between the bands securing the webs together.

15. Apparatus according to claim 1 in which said advancing means and said clamping means are final advancing and clamping means and the apparatus has also primary advancing and primary clamping means, said primary and final clamping means, and said primary and final advancing means, being arranged to operate so that the primary advancing means advances the web material whilst the final clamping means is clamping it and the primary clamping means clamps the web material whilst the final advancing means is advancing it, the rate of the advancement by the primary advancing means being less than the rate of advancement by the final advancing means.

16. Apparatus according to claim 15 in which the primary advancing means has primary advancing devices in the form of gripping members rotatable in gripping association with the web material.

17. Apparatus according to claim 16 in which the gripping members are crank-driven in an oscillatory manner.

18. Apparatus according to claim 16 in which the gripping members are retractable out of said gripping association and are provided with retracting means for so retracting them during advancement of the web material by the final advancing means.

19. Apparatus for producing structural honeycomb material from web material provided in the form of a plurality of superposed webs by cutting the web material transversely to form sections of the web material which apparatus comprises a blade formed with a linear cutting edge, means for advancing the web material a section at a time adjacent to the linear cutting edge, means for clamping the advanced web material in advance of the edge with the sections projecting beyond the edge in turn, a linear guide parallel with the edge, a counting movable to and fro along the linear guide, a blade carried by the mounting and formed with a circular peripheral cutting edge positioned to overlap the linear cutting edge, in web-material cutting association therewith, a drive having a loop of flexible material arranged with a lap connected with the mounting, and extending generally parallel with the linear guide, for moving the mounting to and fro along the guide in a continuous cyclic movement in which the mounting is moved in a first direction to a first reversal position, reversed in its motion, moved in the opposite direction to a second reversal position and again reversed in its motion for further movement in said first direction, said advancing and said clamping means being operable to advance a section of the web material when the mounting is in the region of its reversal positions and to clamp the web material when the mounting is moving to or fro over an intermediate part of its motion between the reversal positions, said blades cooperating to cut the web material transversely during each intermediate part of the cyclic movement of the mounting to cut off the then projecting section of the web material and leave the remainder of the web material with a cut edge at the position of the linear cutting edge, supply means for providing the superposed webs by bringing a plurality of separate webs into face to face relationship, said supply means having adhesive applicators for securing the webs together by longitudinally extending bands of adhesive, and means for applying adhesive to the web material to join the cut sections together in face to face relationship.

20. Apparatus according to claim 19 having a continuously rotatable crank arrangement linked with the loop to move the loop in a reciprocating manner and thereby produce said cyclic movement of the mounting.

21. Apparatus according to claim 19 having a speed-increasing arrangement, and a second loop of flexible material, and the loop is driven via the speed-increasing arrangement by the second loop.

22. Apparatus for producing structural honeycomb material from web material provided in the form of a plurality of superposed webs by cutting the web material transversely to form sections of the web material which apparatus comprises a blade formed with a linear cutting edge, means for advancing the web material a section at a time adjacent to the linear cutting edge, means for clamping the advanced web material in advance of the edge with the sections projecting beyond the edge in turn, a linear guide parallel with the edge, a mounting movable to and fro along the linear guide, a blade carried by the mounting and formed with a circular peripheral cutting edge positioned to overlap the linear cutting edge, in web-material cutting association therewith, a drive for moving the mounting to and fro along the guide in a continuous cyclic movement in which the mounting is moved in a first direction to a first reversal position, reversed in its motion, moved in the opposite direction to a second reversal position and again reversed in its motion for further movement in said first direction, said drive having a belt extending around a pair of pulleys to provide a lap connected with the mounting and extending generally parallel with the linear guide, at least one of said pulleys being drivable by a second belt in a speed-increasing arrangement, said second belt being arranged for reciprocating movement by a slide arranged for reciprocating motion by a continuously rotatable crank arrangement, said advancing and said clamping means being operable to advance a section of the web material when the mounting is in the region of its reversal positions and to clamp the web material when the mounting is moving to or fro over an intermediate part of its motion between the reversal positions, said blades cooperating to cut the web material transversely during each intermediate part of the cyclic movement of the mounting to cut off the then projecting section of the web material and leave the remainder of the web material with a cut edge at the position of the linear cutting edge, supply means for providing the superposed webs by bringing a plurality of separate webs into face to face relationship, said supply means having adhesive applicators for securing the webs together by longitudinally extending bands of adhesive, and means for applying adhesive to the web material to join the cut sections together in face to face relationship.

23. Apparatus according to claim 22 in which the belts and pulleys are of the toothed type.

24. Apparatus for producing structural honeycomb material from web material provided in the form of a plurality of superposed webs by cutting the web material transversely to form sections of the web material which apparatus comprises a blade formed with a linear cutting edge, final advancing means for advancing the web material a section at a time adjacent to the linear cutting edge, final clamping means for clamping the advanced web material in advance of the edge with the sections projecting beyond the edge in turn, a linear guide parallel with the edge, a mounting movable to and fro along the linear guide, a blade carried by the mounting and formed with a circular peripheral cutting edge positioned to overlap the linear cutting edge, in web-material cutting association therewith, a drive for moving the mounting to and fro along the guide in a continuous movement in which the mounting is moved in a first direction to a first reversal position, reversed in its motion, moved in the opposite direction to a second reversal position and again reversed in its motion for further movement in said first direction, said final advancing and said final clamping means being operable to advance a section of the web material when the mounting is in the region of its reversal positions and to clamp the web material when the mounting is moving to or fro over an intermediate part of its motion between the reversal positions, said blades cooperating to cut the web material transversely during each intermediate part of the cyclic movement of the mounting to cut off the then projecting section of the web material and leave the remainder of the web material with a cut edge at the position of the linear cutting edge, primary advancing means and primary clamping means, said primary and final clamping means, and said primary and final advancing means, being arranged to operate so that the primary advancing means advances the web material whilst the final clamping means is clamping it and the primary clamping means clamps the web material whilst the final advancing means is advancing it, the rate of the advancement by the primary advancing means being less than the rate of advancement by the final advancing means, said final advancing means having rotary members for gripping and advancing the web material, said rotary members being driven by means, adapted by slipping to enable the rotary members to stop rotating when they have advanced the web through the distance through which it has been advanced by the primary advancing means, supply means for providing the superposed webs by bringing a plurality of separate webs into face to face relationship, said supply means having adhesive applicators for securing the webs together by longitudinally extending bands of adhesive, and means for applying adhesive to the web material to join the cut sections together in face to face relationship.

25. Apparatus according to claim 24 in which the rotary members are driven by friction clutches.

26. Apparatus for producing structural honeycomb material from web material provided in the form of a plurality of superposed webs by cutting the web material transversely to form sections of the web material which apparatus comprises a blade formed with a linear cutting edge, means for advancing the web material a section at a time adjacent to the linear cutting edge, means for clamping the advanced web material in advance of the edge with the sections projecting beyond the edge in turn, a linear guide parallel with the edge, a mounting movable to and fro along the linear guide, a blade carried by the mounting and formed with a circular peripheral cutting edge positioned to overlap the linear cutting edge, in web-material cutting association therewith, a drive for moving the mounting to and fro along the guide in a continuous cyclic movement in which the mounting is moved in a first direction to a first reversal position, reversed in its motion, moved in the opposite direction to a second reversal position and again reversed in its motion for further movement in said first direction, said advancing and said clamping means being operable to advance a section of the web material when the mounting is in the region of its reversal position and to clamp the web material when the mounting is moving to or fro over an intermediate part of its motion between the reversal positions, said blades cooperating to cut the web material transversely during each intermediate part of the cyclic movement of the mounting to cut off the then projecting section of the web material and leave the remainder of the web material with a cut edge at the position of the linear cutting edge, supply means for providing the superposed webs by bringing a plurality of separate webs into face to face relationship, said supply means having adhesive applicators for securing the webs together by longitudinally extending bands of adhesive, and means for applying adhesive to the web material to join the cut sections together in face to face relationship, said blade formed with a linear cutting edge being provided at intervals along its length with adjustment devices operable, by deforming the blade locally, to adjust the linear cutting edge to maintain the cutting association with the peripheral cutting edge substantially constant when the mounting is moved over the said intermediate part of its motion.

* * * * *